2,772,307

PROCESS FOR PREPARING ETHYLENE SULFONYL CHLORIDE

Harold F. Park, East Longmeadow, Mass., assignor to Monsanto Chemical Company, St. Louis, Mo., a corporation of Delaware No Drawing. Application March 19, 1953,
Serial No. 343,518

5 Claims. (Cl. 260—543)

This invention relates to a process for the preparation of ethylene sulfonyl chloride. More particularly, this invention relates to a process for preparing ethylene sulfonyl chloride from divinyl disulfide.

Ethylene sulfonyl chloride is a valuable monomeric material that is useful for a wide variety of purposes. However, in accordance with known processes, this monomer can be prepared only with difficulty and with an unsatisfactory yield.

Accordingly, an object of the present invention is the provision of a novel process for preparing ethylene sulfonyl chloride.

Another object is the provision of a process for preparing ethylene sulfonyl chloride from divinyl disulfide.

A further object is the provision of a process for preparing ethylene sulfonyl chloride from divinyl disulfide whereby a high yield of ethylene sulfonyl chloride is obtained.

These and other objects are obtained by reacting divinyl disulfide with water and chlorine at a temperature of less than 150° C.

The following examples are given by way of illustration and are not intended as limitations on the scope of this invention. Where parts are mentioned, they are parts by weight.

*Example I*

Place a suitable container in an ice-water bath and add thereto 500 parts of glacial acetic acid, 100 parts of divinyl disulfide and 60 parts of water. Pass 300 parts of gaseous anhydrous chlorine into the solution. Shortly after the last of the chlorine has been added, terminate the reaction by adding 2000 parts of water. The reaction mixture will separate into two layers. Separate the layers by decantation. The bottom layer consists essentially of 175 parts (80% of theoretical yield) of ethylene sulfonyl chloride ($N_D^{25}=1.4630$).

*Example II*

Repeat Example I with but one exception, namely, the addition of 250 parts of chlorine rather than 300 parts of chlorine. When the bottom layer is recovered at the end of the reaction it will consist essentially of about 140 parts of ethylene sulfonyl chloride (65% of theoretical yield).

*Example III*

Repeat Example I with but one exception, namely the use of about 75 parts of water rather than the 60 parts used in Example I. When the bottom layer is recovered at the end of the reaction, it will consist essentially of about 90 parts of ethylene sulfonyl chloride (40% of theoretical yield).

Divinyl disulfide, the starting material for the present invention, is a new compound that may be prepared by the controlled reaction of an alkali metal, alkaline earth metal or quaternary ammonium hydroxide with beta,beta'-dichlorodiethyl disulfide as disclosed in copending Park application Serial No. 343,517 filed March 19, 1953.

As has been described, ethylene sulfonyl chloride is prepared by reacting divinyl disulfide with chlorine and water, the yield being dependent on the amount of water and chlorine used and the reaction conditions employed.

Broadly speaking, it is preferable to use from about 3.0 to 4.5 mols of water per mol of divinyl disulfide and from about 1.0 to 1.3 mols of chlorine per mol of water, the chlorine and water being proportioned so that from about 4 to 6 mols of chlorine are reacted with each mol of divinyl disulfide. The maximum yield of ethylene sulfonyl chloride will be obtained when divinyl disulfide is reacted with substantially 4 mols of water and substantially 5 mols of chlorine per mol of divinyl disulfide. The yield of ethylene sulfonyl chloride will be lower when either more or less than about 5 mols of chlorine per mol of divinyl disufide is used. As the preferred ratio of chlorine to divinyl disulfide is progressively departed from, the yield will be progressively decreased. It is preferable to use anhydrous chlorine in order to provide an accurate control of the amount of water added to the divinyl disulfide. The yield of ethylene sulfonyl chloride will also be lowered through the use of either more or less than about 4 mols of water per mol of divinyl disulfide. As with the chlorine, progressive departure from the preferred ratio of water to divinyl disulfide will result in a progressive decrease in yield.

In carrying out the reaction it is preferable to first add the desired amount of water to the divinyl disulfide and to then add the chlorine, although the two ingredients may be added simultaneously if desired. No substantial amount of chlorine should be added to the divinyl disulfide in the absence of water as the yield will be materially reduced if this is done.

The reaction between divinyl disulfide, water and chlorine should be carried out in solution in order to obtain the most satisfactory yield. The solvent should be one in which divinyl disulfide, chlorine and water are soluble to at least a limited extent and it should also be resistant to reaction with the initial compounds and the products of reaction. A comparatively wide variety of organic solvents may be used such as, for example, unsubstituted or halogen substituted saturated lower aliphatic acids having from 1 to 6 carbon atoms, unsubstituted or halogen substituted cyclic or saturated aliphatic ethers, etc. Among the solvents that may be used either alone or in admixture are compounds such as glacial acetic acid, formic acid, propionic acid, butyric acid, diethyl ether, diisopropyl ether, beta,beta'-dichlorodiethyl ether, dioxane, etc. It is preferable that the solvent be used in an initially anhydrous condition in order to permit accurate control of the amount of water reacted with the divinyl disulfide. Preferably, but not as a matter of necessity, an excess of solvent should be used.

The reaction may be conducted within a wide temperature range. Thus, for example, temperatures as low as $-100°$ C. (obtained through the use of liquid nitrogen as a coolant and diethyl ether as a solvent) and as high as 150° C. may be used. However, when temperatures in excess of about 50° C. are used, spontaneous polymerization of the divinyl disulfide and ethylene sulfonyl chloride will generally occur. For accurate control and ease of reaction it is preferable to use a temperature of from about 0 to 40° C.

The yield will be decreased if the ethylene sulfonyl chloride is permitted to remain in contact with the by-products of the reaction for any substantial period of time. For this reason the reaction should be terminated and the ethylene sulfonyl chloride separated from the by-products of the reaction as soon as possible after the desired amount of chlorine and water have been added to the divinyl disulfide. The time for terminating the reaction may be readily determined by initially adding the desired amount of water and then metering the amount of chlorine added or by metering both reactants as they are added to the divinyl disulfide. Although ethylene sulfonyl chloride is sensitive to the presence of water, the sensitivity is much reduced at low temperatures. Since ethylene sulfonyl chloride is substantially insoluble in ice-water, one convenient method of terminating the reaction and extracting the ethylene sulfonyl chloride after the last of the chlorine and water has been added is through the addition of an amount of ice-water which is in molar excess of the amount of solvent used. When this is done the ethylene sulfonyl chloride will rapidly settle from the resultant aqueous solution and may be separated therefrom by any suitable method, such as by decantation.

Ethylene sulfonyl chloride may be polymerized alone and may also be copolymerized with other vinyl or vinylidene monomers with or without the use of conventional catalysts, redox agents, chain-transfer agents, etc., in order to prepare a wide variety of polymeric products that are useful in the preparation of surface-coatings, soil additives, molding compositions, etc. It may also be used as an intermediate in the preparation of other valuable vinyl compounds such as ethylene sulfonic acid or vinyl sulfonamide.

What is claimed is:

1. A process for preparing ethylene sulfonyl chloride in high yield which comprises reacting divinyl disulfide with substantially 4 mols of water and substantially 5 mols of chlorine per mol of divinyl disulfide, said reaction being carried out at a temperature of about 0–40° C. in solution in a solvent capable of at least partially dissolving said compounds, said solvent being resistant to reaction with said compounds and the products of said reaction, no substantial amount of said chlorine being added in the absence of said water.

2. A process as in claim 1 wherein the solvent is taken from the group consisting of unsubstituted and halogen substituted saturated lower aliphatic acids having from 1 to 6 carbon atoms.

3. A process as in claim 2 wherein the solvent is glacial acetic acid.

4. A process as in claim 1 wherein the reaction is terminated and the ethylene sulfonyl chloride is separated from the by-products of the reaction shortly after the last of the chlorine and water have been added.

5. A process as in claim 4 wherein the reaction is terminated and the ethylene sulfonyl chloride separated from the by-products of the reaction through the addition of an amount of ice-water which is in molar excess of the amount of solvent used.

References Cited in the file of this patent

UNITED STATES PATENTS

| | | |
|---|---|---|
| 2,277,325 | Hueter et al. | Mar. 24, 1942 |
| 2,420,383 | Ross | May 13, 1947 |
| 2,598,014 | Proell et al. | May 27, 1952 |
| 2,653,973 | Hedrick | Sept. 29, 1953 |

FOREIGN PATENTS

| | | |
|---|---|---|
| 546,301 | Great Britain | July 7, 1942 |

OTHER REFERENCES

Lee et al.: Journal of Organic Chem. 5, 81–5 (1940).